US012754551B2

(12) United States Patent
Morinaga et al.

(10) Patent No.: US 12,754,551 B2
(45) Date of Patent: Oct. 6, 2026

(54) AUTONOMOUS MOBILE DEVICE AND CONTROL METHOD

(71) Applicant: SONY GROUP CORPORATION, Tokyo (JP)

(72) Inventors: Eiichiro Morinaga, Tokyo (JP); Junichiro Misawa, Tokyo (JP); Tatsuya Ishikawa, Tokyo (JP); Hiroyuki Kamata, Tokyo (JP); Kazutaka Takaki, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 224 days.

(21) Appl. No.: 18/246,106

(22) PCT Filed: Sep. 24, 2021

(86) PCT No.: PCT/JP2021/034955

§ 371 (c)(1), (2) Date: Mar. 21, 2023

(87) PCT Pub. No.: WO2022/075083

PCT Pub. Date: Apr. 14, 2022

(65) Prior Publication Data

US 2023/0367330 A1 Nov. 16, 2023

(30) Foreign Application Priority Data

Oct. 9, 2020 (JP) ................................ 2020-171552

(51) Int. Cl.
*G05D 1/00* (2024.01)

(52) U.S. Cl.
CPC ................................ *G05D 1/0268* (2013.01)

(58) Field of Classification Search
CPC ........ G05D 1/0268; G05D 1/02; G05D 1/027; G05D 1/0272; G01C 21/165; G01C 21/206; G01C 22/02
(Continued)

(56) References Cited

U.S. PATENT DOCUMENTS 10,747,223 B1 8/2020 Eade
10,775,804 B1 9/2020 Eade
(Continued)

FOREIGN PATENT DOCUMENTS

CN 103197279 A 7/2013
CN 107228663 A 10/2017
(Continued)

OTHER PUBLICATIONS

Li et al. (CN110307836A); Beijing Idriverplus Tech Co Ltd; Accurate positioning method for edgewise cleaning by unmanned cleaning vehicle (Year: 2019).*
(Continued)

*Primary Examiner* — B M M Hannan
(74) *Attorney, Agent, or Firm* — CHIP LAW GROUP

(57) ABSTRACT

The present disclosure relates to an autonomous mobile device, a control method, and a program which enable higher-speed self-position estimation with higher accuracy and with a smaller calculation load. Provided is an autonomous mobile device including: a sensor unit including at least a first sensor that detects an angular velocity, a second sensor that is installed in a housing and detects a speed of a wheel, and a third sensor that detects a displacement amount on a two-dimensional plane; and a self-position estimation unit that estimates a self-position on the basis of parameters calculated by the sensor unit, the self-position estimation unit using a predetermined parameter suitable for a predetermined condition among the parameters of the respective
(Continued)

sensors calculated by the sensor unit when estimating the self-position. The present disclosure can be applied to, for example, an autonomous mobile robot device.

17 Claims, 10 Drawing Sheets

(58) Field of Classification Search
USPC .......................................................... 700/253
See application file for complete search history.

(56) References Cited

U.S. PATENT DOCUMENTS

| | | | | |
|---|---|---|---|---|
| 2006/0129276 | A1* | 6/2006 | Watabe | G05D 1/024 701/23 |
| 2008/0154429 | A1* | 6/2008 | Lee | G05D 1/0272 901/1 |
| 2009/0076651 | A1* | 3/2009 | Lee | G05D 1/027 901/50 |
| 2016/0152241 | A1* | 6/2016 | Denda | G05D 1/0272 701/23 |
| 2016/0227704 | A1* | 8/2016 | Yamamura | A01D 34/008 |
| 2017/0153646 | A1* | 6/2017 | Shin | G06V 10/507 |
| 2017/0307385 | A1* | 10/2017 | Izumi | G01C 21/28 |
| 2018/0345504 | A1* | 12/2018 | Chen | G05D 1/024 |
| 2019/0113631 | A1* | 4/2019 | Stroiescu | G01S 19/396 |
| 2020/0050213 | A1* | 2/2020 | Lim | G06V 20/70 |
| 2022/0055626 | A1* | 2/2022 | Gariepy | B60T 8/175 |
| 2022/0082390 | A1* | 3/2022 | Kameoka | G01C 21/3848 |

FOREIGN PATENT DOCUMENTS

| | | | | | |
|---|---|---|---|---|---|
| CN | 109059904 | A | | 12/2018 | |
| CN | 110017850 | A | | 7/2019 | |
| CN | 110161488 | A | | 8/2019 | |
| CN | 110307836 | A | * | 10/2019 | G01C 21/005 |
| JP | 2011-008385 | A | | 1/2011 | |

OTHER PUBLICATIONS

JP2011096170A. Translate (Year: 2011).*
JP2016157197A.Translate.in.English (Year: 2016).*
JP2017207942A.translate (Year: 2017).*
WO2019049655.translate (Year: 2019).*
International Search Report and Written Opinion of PCT Application No. PCT/JP2021/034955, issued on Nov. 2, 2021, 09 pages of ISRWO.

* cited by examiner

AUTONOMOUS MOBILE DEVICE AND CONTROL METHOD

CROSS REFERENCE TO RELATED APPLICATIONS

This application is a U.S. National Phase of International Patent Application No. PCT/JP2021/034955 filed on Sep. 24, 2021, which claims priority benefit of Japanese Patent Application No. JP 2020-171552 filed in the Japan Patent Office on Oct. 9, 2020. Each of the above-referenced applications is hereby incorporated herein by reference in its entirety.

TECHNICAL FIELD

The present disclosure relates to an autonomous mobile device, a control method, and a program, and more particularly, to an autonomous mobile device, a control method, and a program which enable higher-speed self-position estimation with higher accuracy and with a smaller calculation load.

BACKGROUND ART

In recent years, research and development of robots having an autonomous movement function have been actively conducted. In this type of autonomous mobile robots, a function of grasping a self-position is essential.

As a technology related to such self-position estimation, for example, there is a technology disclosed in Patent Document 1. Patent Document 1 discloses a technology of switching parameters for self-position estimation in accordance with a traveling environment during traveling.

CITATION LIST

Patent Document

Patent Document 1: Japanese Patent Application Laid-Open No. 2020-95339

SUMMARY OF THE INVENTION

Problems to be Solved by the Invention

In the technology disclosed in Patent Document 1, the accuracy of self-position estimation can be improved, but it is required to reduce a calculation load and increase the speed while improving the accuracy at the time of self-position estimation.

The present disclosure has been made in view of such a situation, and an object thereof is to enable higher-speed self-position estimation with higher accuracy and with a smaller calculation load.

Solutions to Problems

An autonomous mobile device according to one aspect of the present disclosure is an autonomous mobile device including: a sensor unit including at least a first sensor that detects an angular velocity, a second sensor that is installed in a housing and detects a speed of a wheel, and a third sensor that detects a displacement amount on a two-dimensional plane; and a self-position estimation unit that estimates a self-position on the basis of parameters calculated by the sensor unit, the self-position estimation unit using a predetermined parameter suitable for a predetermined condition among the parameters of the respective sensors calculated by the sensor unit when estimating the self-position.

A control method according to one aspect of the present disclosure a control method including estimating, by an autonomous mobile device, a self-position on the basis of parameters calculated by a sensor unit including at least a first sensor that detects an angular velocity, a second sensor that is installed in a housing and detects a speed of a wheel, and a third sensor that detects a displacement amount on a two-dimensional plane, in which a predetermined parameter suitable for a predetermined condition is used among the parameters of the respective sensors calculated by the sensor unit when the self-position is estimated.

A program according to one aspect of the present disclosure is a program for causing a computer to function as an autonomous mobile device including: a sensor unit including at least a first sensor that detects an angular velocity, a second sensor that is installed in a housing and detects a speed of a wheel, and a third sensor that detects a displacement amount on a two-dimensional plane; and a self-position estimation unit that estimates a self-position on the basis of parameters calculated by the sensor unit, the self-position estimation unit using a predetermined parameter suitable for a predetermined condition among the parameters of the respective sensors calculated by the sensor unit when estimating the self-position.

In the autonomous mobile device, the control method, and the program according to the aspects of the present disclosure, the self-position is estimated on the basis of the parameters calculated by the sensor unit including at least the first sensor that detects the angular velocity, the second sensor that is installed in the housing and detects the speed of the wheel, and the third sensor that detects the displacement amount on the two-dimensional plane. Furthermore, when the self-position is estimated, the predetermined parameter suitable for the predetermined condition is used among the parameters of the respective sensors calculated by the sensor unit.

Note that the autonomous mobile device according to the aspect of the present disclosure may be an independent device or an internal block constituting one device.

MODE FOR CARRYING OUT THE INVENTION

1. Embodiment of Present Technology (Configuration of External Appearance)

Figure 1:
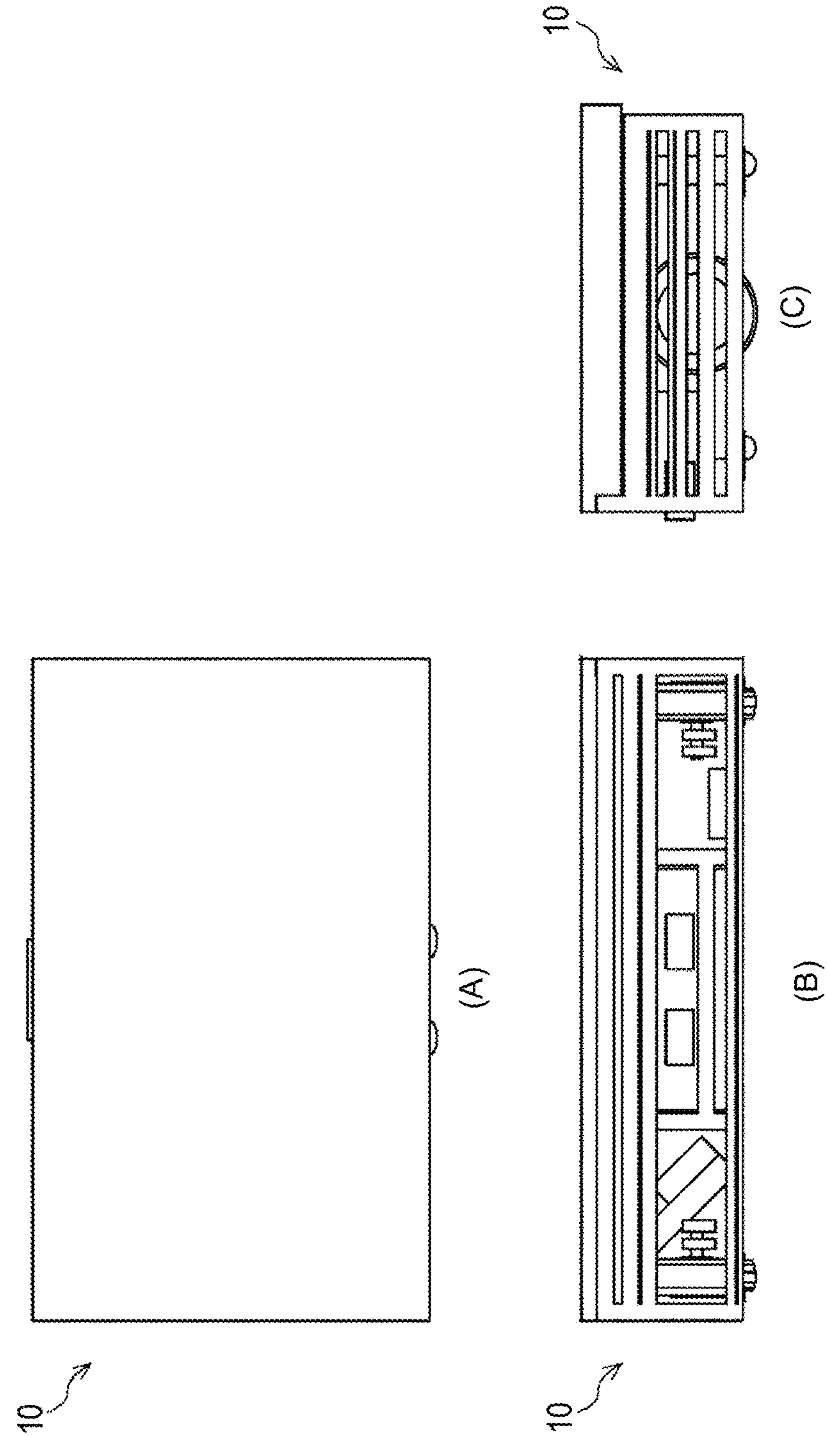
FIG. 1 is a view illustrating a first example of a configuration of an external appearance of a robot device to which the present disclosure is applied.
Figure 2:
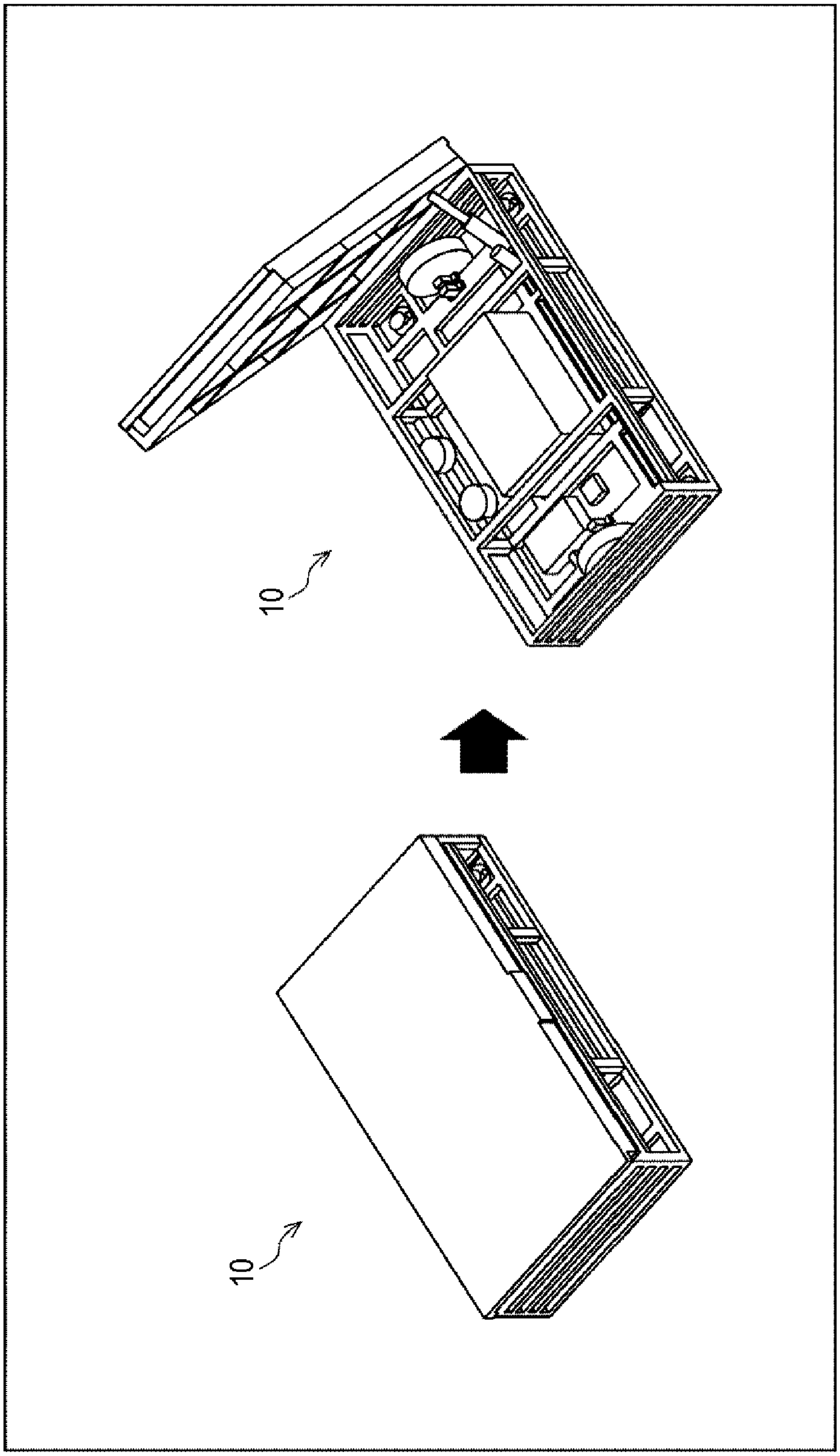
FIG. 2 is a view illustrating a second example of the configuration of the external appearance of the robot device to which the present disclosure is applied.

FIGS. 1 and 2 illustrate examples of an external configuration of a robot device to which the present disclosure is applied. FIG. 1 illustrates a top view, a front view, and a side view of the robot device to which the present disclosure is applied. FIG. 2 illustrates a view of a state in which a display in the robot device to which the present disclosure is applied has been moved.

A robot device 10 is an autonomous robot. Furthermore, the robot device 10 is a mobile robot (autonomous mobile robot) having a moving mechanism such as a wheel, and is freely movable in a space.

The robot device 10 has a substantially rectangular parallelepiped shape, and has a display capable of displaying display information such as a video on an upper surface thereof. In the robot device 10, the display (screen) on the upper surface is movable, and can be adjusted to a desired angle with respect to a plane (a moving surface such as a floor surface or a ground surface) to fix its attitude.

(Constituent Elements)

Figure 3:
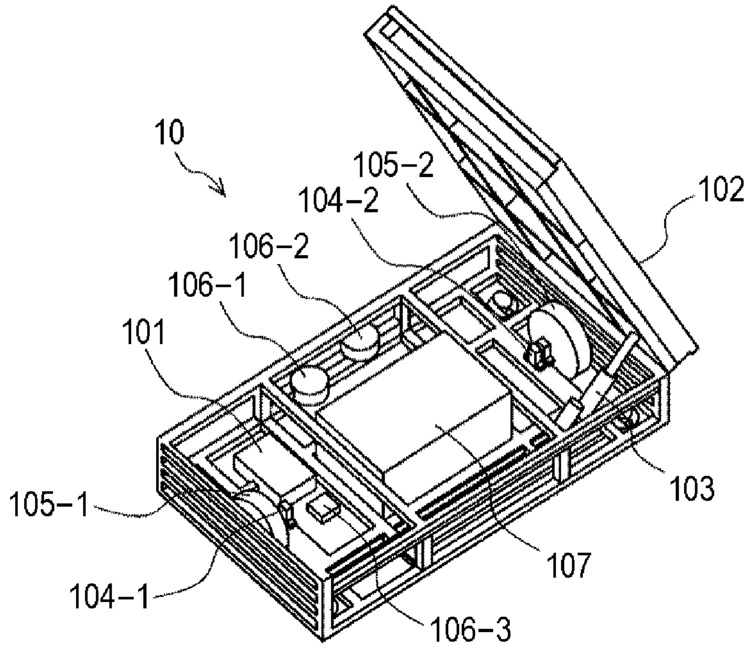
FIG. 3 is a view illustrating an example of constituent elements of the robot device to which the present disclosure is applied.

FIG. 3 illustrates an example of constituent elements of the robot device to which the present disclosure is applied. In FIG. 3, the robot device 10 includes a control unit 101 that controls operation of each unit, a video display unit 102 including the display that displays a video, and a screen lifting and lowering unit 103 including a mechanism for lifting or lowering the video display unit 102.

In FIG. 3, the thin plate-shaped video display unit 102 provided on an upper surface of a housing of the robot device 10 is moved by the screen lifting and lowering unit 103 and fixed in a desired attitude. In this manner, in the robot device 10, the video display unit 102 can move with its lower end part as the center, and the inside of the housing is exposed to the outside when the video display unit 102 is opened upward.

The robot device 10 includes a left motor encoder 104-1, a left motor 105-1, a right motor encoder 104-2, and a right motor 105-2. The robot device 10 uses a drive type that is a differential two-wheel drive type, and can be moved by left and right wheels when the left motor 105-1 and the right motor 105-2 operate, respectively. The left motor encoder 104-1 and the right motor encoder 104-2 detect rotational movement amounts of the left motor 105-1 and the right motor 105-2, and the like.

The robot device 10 includes various sensors such as sensors 106-1 to 106-3. The sensors 106 include an inertial measurement unit (IMU) and the like. The robot device 10 operates as the autonomous mobile robot using sensor signals detected by the various sensors. A battery unit 107 supplies power to the respective units of the robot device 10.

(Functional Configurations)

Figure 4:
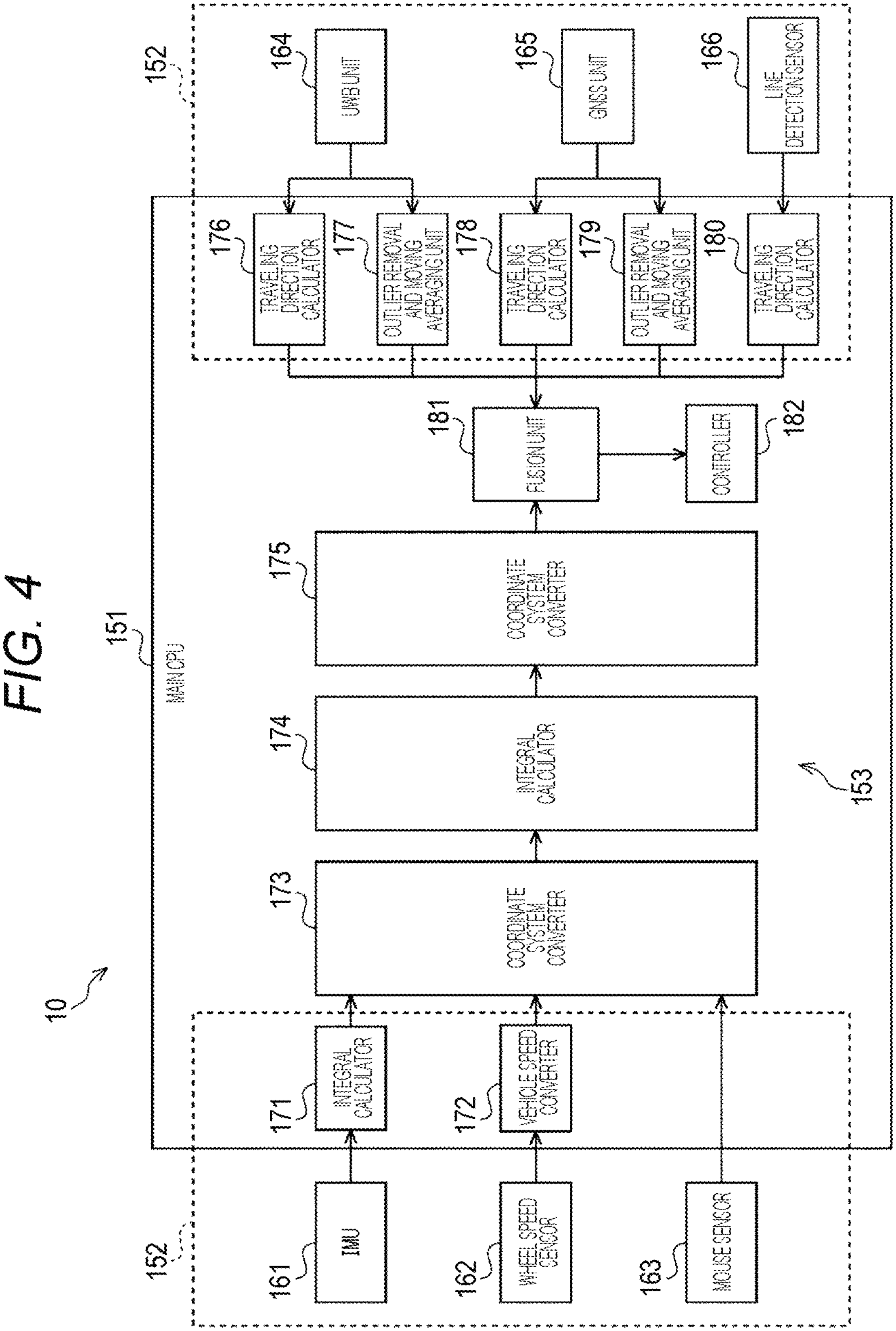
FIG. 4 is a diagram illustrating an example of functional configurations of the robot device to which the present disclosure is applied.

FIG. 4 illustrates an example of functional configurations of the robot device to which the present disclosure is applied.

The robot device 10 includes a main CPU 151, an IMU 161, a wheel speed sensor 162, a mouse sensor 163, a UWB unit 164, a GNSS unit 165, and a line detection sensor 166. The main CPU 151 is included in the control unit 101 of FIG. 3. Any of the IMU 161 to the line detection sensor 166 corresponds to the sensors 106-1 to 106-3 in FIG. 3.

The main CPU 151 includes an integral calculator 171, a vehicle speed converter 172, a coordinate system converter 173, an integral calculator 174, a coordinate system converter 175, a traveling direction calculator 176, an outlier removal and moving averaging unit 177, a traveling direction calculator 178, an outlier removal and moving averaging unit 179, a traveling direction calculator 180, a fusion unit 181, and a controller 182.

The IMU 161 detects angular velocities and accelerations by a three-axis gyroscope and a three-axis accelerometer. Here, a Z-axis angular velocity (GyroZ value) among three-axis angular velocities (values of the gyroscope) is integrated and used to obtain a traveling direction of a device body. That is, the integral calculator 171 performs an integral calculation (yaw angle calculation) on the Z-axis angular velocity detected by the IMU 161 to calculate an attitude angle of the device body. Note that a physical structure part of the robot device 10 is also referred to as the device body in the following description.

Note that there is an IMU on which a compass is mounted, but the compass is affected by a surrounding environment and a metal portion of the device body, and thus, is not used herein. Furthermore, regarding the acceleration, for example, the acceleration can be used only for estimation of the gravity direction when the device body is stationary in a case of a robot device that moves at a high speed since vibration is relatively large.

In this manner, the IMU 161 is used for the estimation of the traveling direction of the device body using the Z-axis angular velocity, but is affected by gyro drift, and thus, position information (an absolute position) acquired by the UWB unit 164 or the GNSS unit 165 may be used regarding an absolute orientation error. Note that, as the IMU 161, what has six or more axes may be used to estimate the gravity direction, but a single-axis gyroscope may be used instead. Furthermore, a gyro sensor may be used instead of the IMU 161.

The wheel speed sensor 162 is a wheel encoder or the like installed separately from a drive wheel (installed in the housing). Since the wheel speed sensor 162 is installed in a portion other than the drive wheel, no slip occurs at the time of acceleration or deceleration, and a travel distance of the device body in the traveling direction can be obtained with high accuracy. On the other hand, since a slip occurs in a direction other than the traveling direction of the device body, the wheel speed sensor 162 is used to estimate a movement distance with respect to the traveling direction of the device body. The vehicle speed converter 172 converts a signal from the wheel speed sensor 162 into a speed of the device body.

Note that, in a case where a state of a road surface (for example, a road surface on which a slip hardly occurs) or an instructed acceleration or deceleration is less than a predetermined value, an encoder installed in the drive wheel may be used. Furthermore, the wheel speed sensor 162 is not limited to the encoder, and an angle detector such as a Hall sensor or a resolver may be used.

The mouse sensor 163 is an optical laser mouse sensor or the like. The mouse sensor 163 can obtain an absolute distance (XY displacement amounts) on an XY plane, but is not capable of accurately obtaining a movement amount when the device body moves at a high speed. Therefore, the mouse sensor 163 is used to estimate a slip amount in a vertical direction (lateral direction) with respect to the traveling direction of the device body at the time of low-speed traveling in which the speed is lower than a predetermined speed.

Furthermore, in general, it is difficult to maintain a rotation center at a fixed point due to the influence of a slip caused by weight distribution or the like in a spin turn of the differential two-wheeled robot device, and thus, the XY displacement amounts detected by the mouse sensor 163 may be used to detect a positional deviation on the plane.

The attitude angle output from the integral calculator 171, the speed output from the vehicle speed converter 172, and the XY displacement amounts output from the mouse sensor 163 are input to the coordinate system converter 173. However, only a parameter suitable for a predetermined condition is input to the coordinate system converter 173, for example, the XY displacement amounts are input only at the time of low-speed traveling. The coordinate system converter 173 converts a coordinate system of the attitude angle, the speed, and the XY displacement amounts input thereto from a vehicle coordinate system to a local coordinate system, and outputs the local coordinate system to the integral calculator 174.

The integral calculator 174 performs an integral calculation on the attitude angle, the speed, and the XY displacement amounts of the local coordinate system input thereto, thereby estimating a self-position by inertial navigation, and outputs the self-position to the coordinate system converter 175. The coordinate system converter 175 converts the coordinate system of the self-position input thereto from the local coordinate system to a world coordinate system, and outputs the world coordinate system to the fusion unit 181.

The UWB unit 164 acquires position information (for example, XY coordinate values of the world coordinate system) measured using an ultra-wide band (UWB). The GNSS unit 165 acquires position information (for example, latitude and longitude values) measured using a global navigation satellite system (GNSS). The GNSS includes a satellite positioning system such as a global positioning system (GPS).

The UWB unit 164 and the GNSS unit 165 are position sensors capable of obtaining an absolute position, but operate at a low rate, and thus, when being used without any change, it is difficult to use processing such as moving averaging in a case where the device body moves at a high speed, and a large position error is likely to occur. However, in a case where it is known in advance that the device body is traveling straight, the traveling direction of the device body in the global coordinate system at the time of straight traveling can be obtained with high accuracy from a difference between sensor values at a position obtained a certain time ago and a current position.

However, the rate is low in the case of using these position sensors, and thus, an orientation may be estimated by performing sensor fusion using an orientation calculated from the IMU 161 at a high rate and a Kalman filter or the like. That is, in a case where the device body travels straight at a speed equal to or higher than a predetermined speed, the traveling direction of the device body based on the Z-axis angular velocity detected by the IMU 161 can be corrected using the absolute position (sensor position) acquired by the UWB unit 164 or the GNSS unit 165.

In the case of using the absolute position (sensor position) obtained by these position sensors, it is known that both the UWB and the GNSS are affected by multipath, and thus, it is possible to mitigate the influence of multipath by using a moving average obtained by removing an outlier or the like only while the device body is stationary or making a spin turn.

That is, in the case where the device body travels straight at the speed equal to or higher than the predetermined speed, the traveling direction calculator 176 calculates an attitude angle of the device body by calculating the traveling direction using the XY coordinate values acquired by the UWB unit 164. The outlier removal and moving averaging unit 177 estimates a current position (XY coordinate values) by using a moving average obtained by removing an outlier from the XY coordinate values acquired by the UWB unit 164 in the case where the device body is stationary or making a spin turn.

Furthermore, in the case where the device body travels straight at the speed equal to or higher than the predetermined speed, the traveling direction calculator 178 calculates an attitude angle of the device body by calculating the traveling direction using the latitude and longitude values acquired by the GNSS unit 165. The outlier removal and moving averaging unit 179 estimates a current position (XY coordinate values) by using a moving average obtained by removing an outlier from the latitude and longitude values acquired by the GNSS unit 165 in the case where the device body is stationary or making a spin turn.

Note that it is sufficient to provide at least one of the UWB unit 164 or the GNSS unit 165. Furthermore, it is a matter of course that one UWB unit 164 and one GNSS unit 165 may be mounted, and a plurality of UWB units and a plurality of GNSS units may be mounted. For example, two UWB units 164 and two GNSS units 165 may be mounted, and an orientation may be detected from a difference between two coordinate values. Furthermore, the UWB unit 164 may be used indoors, and the GNSS unit 165 may be used outdoors.

The line detection sensor 166 is a sensor that irradiates a moving surface, such as a floor surface, with light of a light emitting diode (LED) or the like and identifies a position of a line on the moving surface on the basis of an intensity, a color, or the like of reflected light of the light. For example, in a case where a white line is drawn on a floor surface with high accuracy in a gymnasium or the like, a position of the white line can be identified by the line detection sensor 166 when the device body travels on the white line.

Here, when the device body travels straight, an absolute orientation can be obtained from a difference between a line detection position obtained a certain time ago and a current line detection position. That is, in a case where the device body is traveling on the line, the traveling direction calculator 180 calculates the traveling direction using the line position detected by the line detection sensor 166 to calculate an attitude angle of the device body.

The attitude angle output from the traveling direction calculator 176, the XY coordinate values output from the outlier removal and moving averaging unit 177, the attitude angle output from the traveling direction calculator 178, the XY coordinate values output from the outlier removal and moving averaging unit 179, and the attitude angle output from the traveling direction calculator 180 are input to the fusion unit 181.

However, the attitude angles from the traveling direction calculator 176 and the traveling direction calculator 178 are input only at the time of high-speed straight traveling. Furthermore, the XY coordinate values from the outlier removal and moving averaging unit 177 and the outlier removal and moving averaging unit 179 are input only at the time of being stationary or making a spin turn. Moreover, the attitude angle from the traveling direction calculator 180 is input only at the time of traveling on the line. That is, only a parameter suitable for a predetermined condition is input to the fusion unit 181.

The fusion unit 181 has a function for implementing sensor fusion such as a Kalman filter, a complementary filter, or an adder/subtractor. The fusion unit 181 fuses the self-position obtained by the inertial navigation from the coordinate system converter 175 and the attitude angles and the XY coordinate values from the traveling direction calculator 176 to the traveling direction calculator 180 using the Kalman filter or the like, thereby estimating a self-position in the world coordinate system. That is, the fusion unit 181 obtains the self-position based on a predetermined parameter suitable for a predetermined condition among parameters obtained from the sensor signals detected by the IMU 161, the wheel speed sensor 162, the mouse sensor 163, the UWB unit 164, the GNSS unit 165, and the line detection sensor 166.

Since the self-position obtained in this manner is selectively used only in a domain where each of the sensors can perform detection with high accuracy, the self-position has high accuracy. Furthermore, since the parameter to be used is limited when the self-position is estimated, a decrease in calculation load and an increase in speed are achieved. That is, various sensors can be provided as internal sensors and external sensors in the robot device 10, but each of the sensors is used only for the domain where each of the sensors can perform detection (measurement) with high accuracy by utilizing characteristics of the sensors, so that it is possible to implement higher-speed self-position estimation with higher accuracy and with a smaller calculation load.

The self-position obtained by the fusion unit 181 is output to the controller 182 and used for various types of processing to implement autonomous movement. Furthermore, the controller 182 can control the video display unit, the screen lifting and lowering unit 103, and the like on the basis of the self-position. Therefore, in the robot device 10, the display and the attitude of the display can be changed according to the self-position.

Note that, in FIG. 4, the IMU 161, the integral calculator 171, the wheel speed sensor 162, the vehicle speed converter 172, the mouse sensor 163, the UWB unit 164, the traveling direction calculator 176, the outlier removal and moving averaging unit 177, the GNSS unit 165, the traveling direction calculator 178, the outlier removal and moving averaging unit 179, the line detection sensor 166, and the traveling direction calculator 180 constitute a sensor unit 152.

Furthermore, in FIG. 4, the integral calculator 171, the vehicle speed converter 172, the coordinate system converter 173, the integral calculator 174, the coordinate system converter 175, the traveling direction calculator 176, the outlier removal and moving averaging unit 177, the traveling direction calculator 178, the outlier removal and moving averaging unit 179, the traveling direction calculator 180, and the fusion unit 181 constitute a self-position estimation unit 153. That is, the integral calculator 171, the vehicle speed converter 172, the traveling direction calculator 176, the outlier removal and moving averaging unit 177, the traveling direction calculator 178, the outlier removal and moving averaging unit 179, or the traveling direction calculator 180 may be included in either the sensor unit 152 or the self-position estimation unit 153.

Furthermore, the configurations illustrated in FIG. 4 are an example, and the illustrated constituent elements may be removed or a new constituent element may be added. For example, the line detection sensor 166 and the traveling direction calculator 180 are not necessarily provided. Furthermore, the sensor unit 152 may include a camera, a distance measurement sensor, a communication module compatible with near-field communication such as Bluetooth (registered trademark), and the like, and a signal processing circuit corresponding thereto may be provided.

(IMU Processing)

Figure 5:
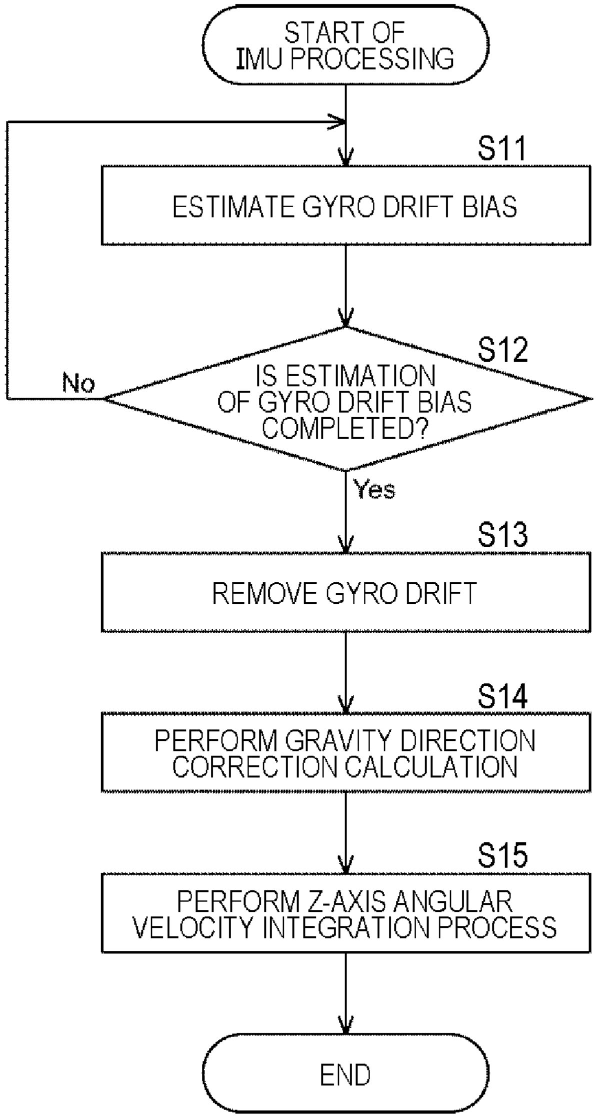
FIG. 5 is a flowchart for describing processing related to an IMU.

Processing related to the IMU 161 will be described with reference to a flowchart of FIG. 5.

In step S11, a gyro drift bias of the IMU 161 is estimated. Here, it is known that an output value of the gyroscope of the IMU 161 includes an offset. In general, the offset has an extremely small value, but is accumulated in the case of being integrated, and thus, a finally obtained relative orientation includes a large error. Such a phenomenon is called gyro drift.

When the estimation of the gyro drift bias is completed (Yes in S12), the processing proceeds to step S13. In step S13, the gyro drift of the IMU 161 is removed.

In step S14, a gravity direction correction calculation (correction GyroZ calculation) is performed. However, the process in step S14 may be skipped. In step S15, a Z-axis angular velocity (GyroZ value) integration process is performed. An attitude angle obtained by this integration process is used for self-position estimation.

Note that steps S13 to S15 are not limited to the rotation in a yaw direction corresponding to the Z-axis angular velocity, and for example, attitude calculation processing used in an attitude heading reference system (AHRS) may be used.

(Wheel Encoder Processing)

Figure 6:
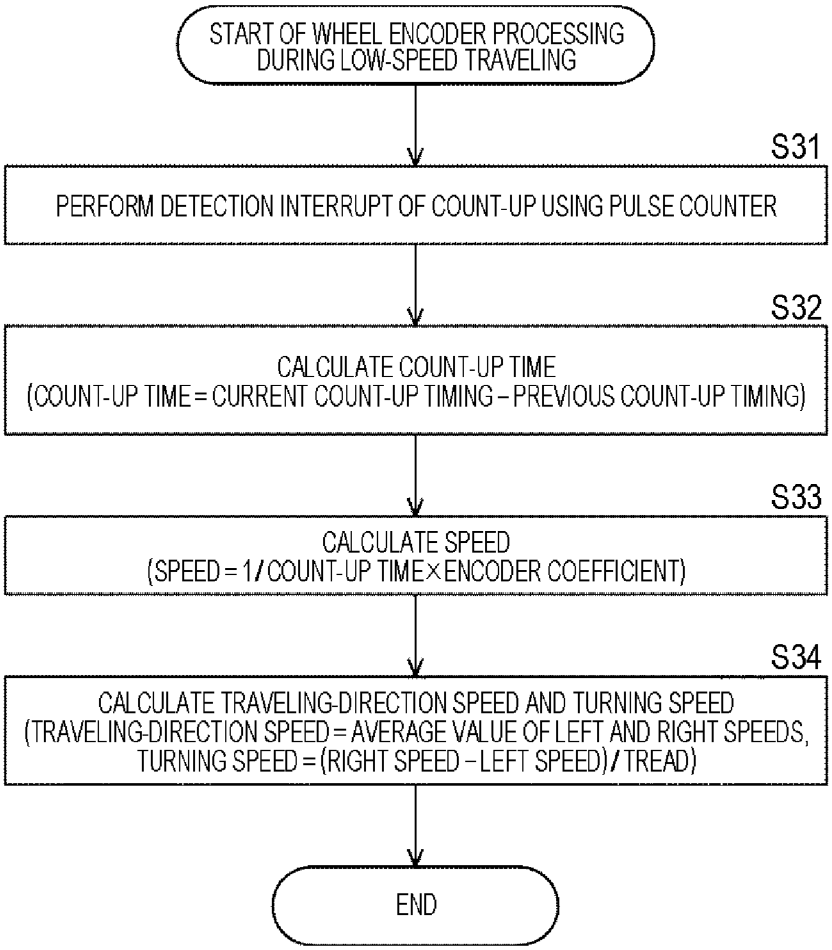
FIG. 6 is a flowchart for describing processing related to a wheel encoder at the time of low-speed traveling.
Figure 7:
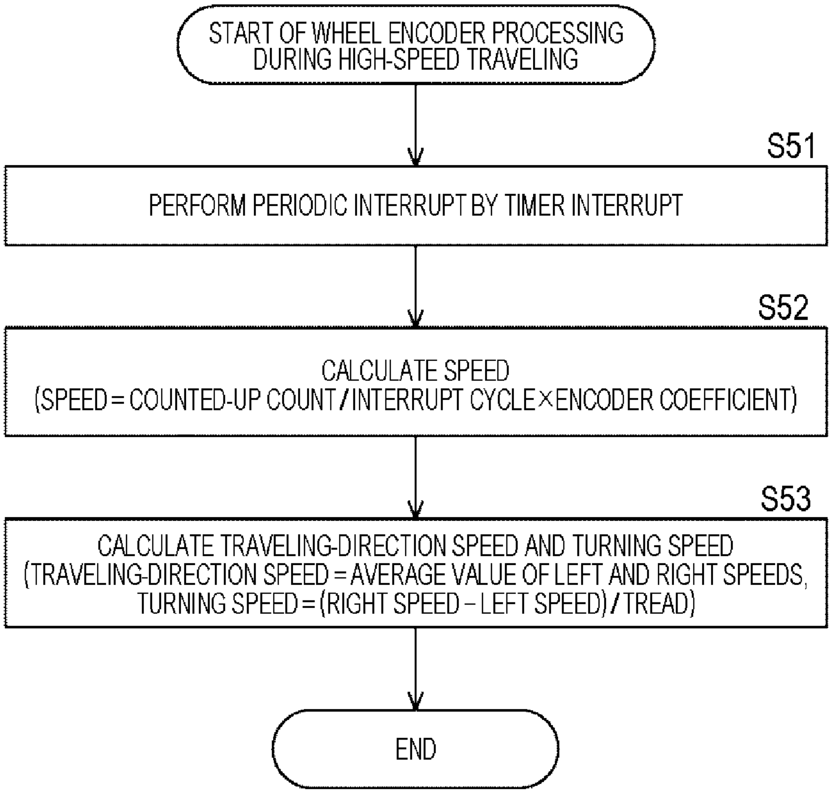
FIG. 7 is a flowchart for describing processing related to the wheel encoder at the time of high-speed traveling.

Processing related to a wheel encoder at the time of low-speed traveling will be described with reference to a flowchart of FIG. 6. In FIGS. 6 and 7, the processing related to the wheel encoder will be described as an example of processing related to the wheel speed sensor 162.

In step S31, a detection interrupt of count-up using a pulse counter is performed. In step S32, a count-up time is calculated. The count-up time is calculated by the following Formula (1).

$$\text{Count-up time} = \text{current count-up timing} - \text{previous count-up timing} \quad (1)$$

In step S33, a speed is calculated by applying the count-up time in step S32 to the following Formula (2).

$$\text{Speed} = 1/\text{count-up time} \times \text{encoder coefficient} \quad (2)$$

In step S34, a traveling-direction speed and a turning speed are calculated by applying the speed calculated in step S33 to the following Formulas (3) and (4), respectively. In this manner, the traveling-direction speed and the turning speed obtained at the time of low-speed traveling when the speed of the device body is lower than a predetermined speed are used for self-position estimation. Note that "tread" in Formula (4), is a distance between centers of the left and right wheels.

$$\text{Traveling-direction speed} = \text{average value of left and right speeds} \quad (3)$$

$$\text{Turning speed} = (\text{right speed} - \text{left speed})/\text{tread} \quad (4)$$

Next, processing related to the wheel encoder at the time of high-speed traveling will be described with reference to a flowchart of FIG. 7.

In step S51, a periodic interrupt by a timer interrupt is performed. For example, as this interrupt cycle, an interrupt is performed at a predetermined cycle such as 10 milliseconds. In step S52, the interrupt cycle in step S51 is applied to the following Formula (5) to calculate a speed.

Speed=counted-up count/interrupt cycle×encoder coefficient (5)

In step S53, a traveling-direction speed and a turning speed are calculated by applying the speed calculated in step S52 to the following Formulas (6) and (7), respectively. In this manner, the traveling-direction speed and the turning speed obtained at the time of high-speed traveling when the speed of the device body is equal to or higher than the predetermined speed are used for self-position estimation.

Traveling-direction speed=average value of left and right speeds (6)

Turning speed=(right speed−left speed)/tread (7)

(Mouse Sensor Processing)

Figure 8:
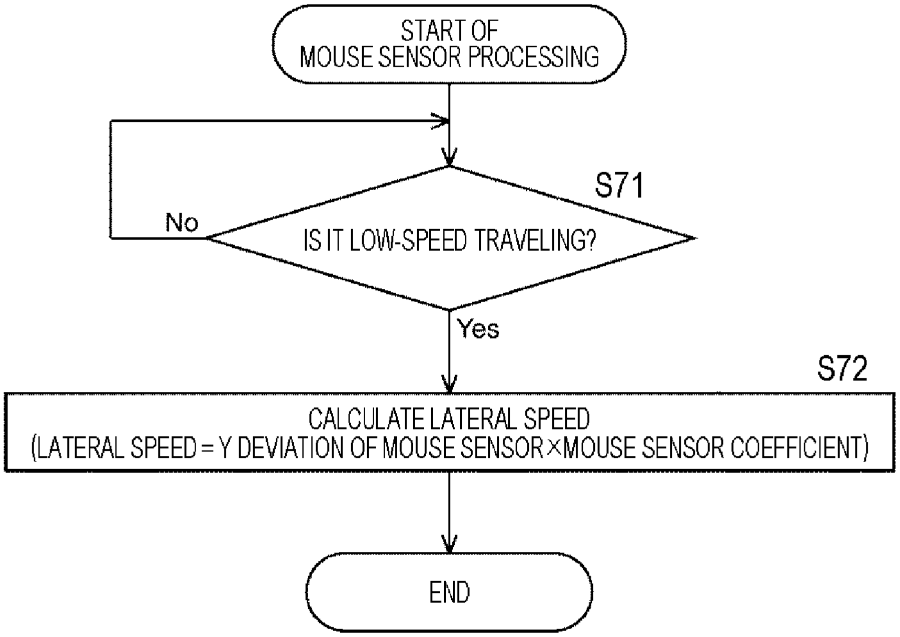
FIG. 8 is a flowchart illustrating processing related to a mouse sensor.

Processing related to the mouse sensor 163 will be described with reference to a flowchart of FIG. 8.

In step S71, it is determined whether or not the device body is traveling at a low speed based on whether the speed of the device body is lower than the predetermined speed. In a case where it is determined in the determination process of step S71 that the device body is traveling at a low speed, the processing proceeds to step S72.

In step S72, a lateral speed, which is the speed in the vertical direction (lateral direction) with respect to the traveling direction of the device body, is calculated using the following Formula (8). In this manner, the lateral speed obtained at the time of low-speed traveling when the speed of the device body is lower than the predetermined speed is used for self-position estimation.

Lateral speed=$Y$ deviation of mouse sensor×mouse sensor coefficient (8)

(UWB/GNSS Processing)

Figure 9:
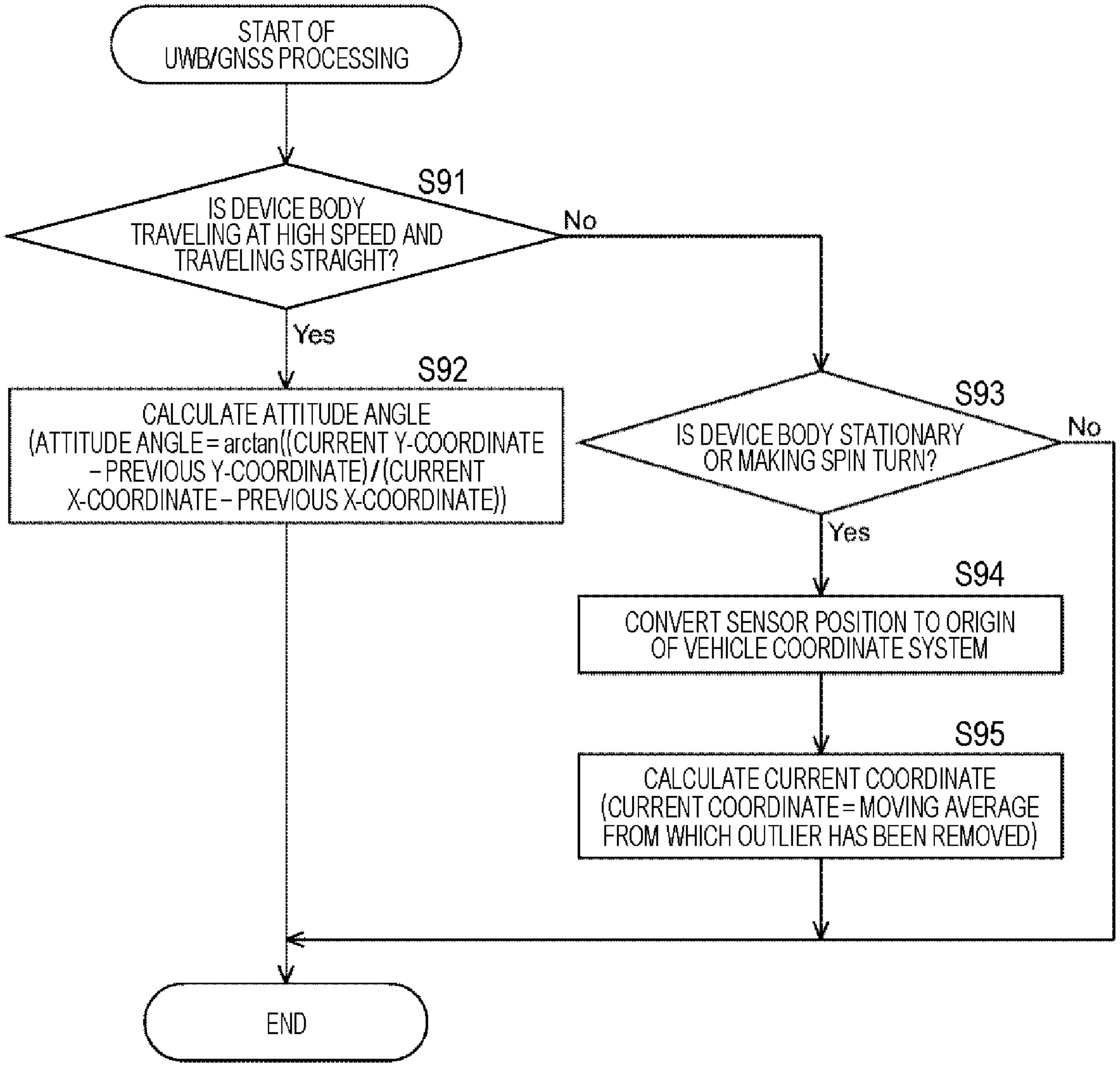
FIG. 9 is a flowchart illustrating processing related to a UWB unit or a GNSS unit.

Processing related to the UWB unit 164 or the GNSS unit 165 will be described with reference to a flowchart of FIG. 9.

In step S91, it is determined whether or not the device body is traveling at a high speed and traveling straight. In a case where it is determined in the determination process of step S91 that the device body travels at a high speed and travels straight, the processing proceeds to step S92.

In step S92, an attitude angle of the device body is calculated using the following Formula (9) on the basis of a sensor position obtained by the UWB unit 164 or the GNSS unit 165.

Attitude angle=arctan((current $Y$-coordinate−previous $Y$-coordinate)/(current $X$-coordinate−previous $X$-coordinate)) (9)

On the other hand, in a case where it is determined in the determination process of step S91 that the device body does not travel at a high speed and travel straight, the processing proceeds to step S93. In step S93, it is determined whether or not the device body is stationary or making a spin turn.

In a case where it is determined in the determination process of step S93 that the device body is stationary or making a spin turn, the processing proceeds to step S94. In step S94, the sensor position obtained by the UWB unit 164 or the GNSS unit 165 is converted into the origin of the vehicle coordinate system.

In step S95, a current coordinate (XY coordinate values) is calculated using a moving average obtained by removing an outlier with respect to the sensor position (XY coordinate values) converted to the origin of the vehicle coordinate system. That is, here, a relationship of the following Formula (10) is used.

Current coordinate=moving average from which outlier has been removed (10)

In this manner, the attitude angle obtained when the device body travels at a high speed and travels straight is used for self-position estimation. Furthermore, the current coordinate (XY coordinate values) obtained when the device body is stationary or making a spin turn is used for self-position estimation. Note that, in a case where the process in step S92 or S95 is ended, or it is determined in the determination process of step S93 that the device body is not stationary or moving a spin turn, the processing related to the UWB unit 164 or the GNSS unit 165 is ended.

(Line Sensor Processing)

Figure 10:
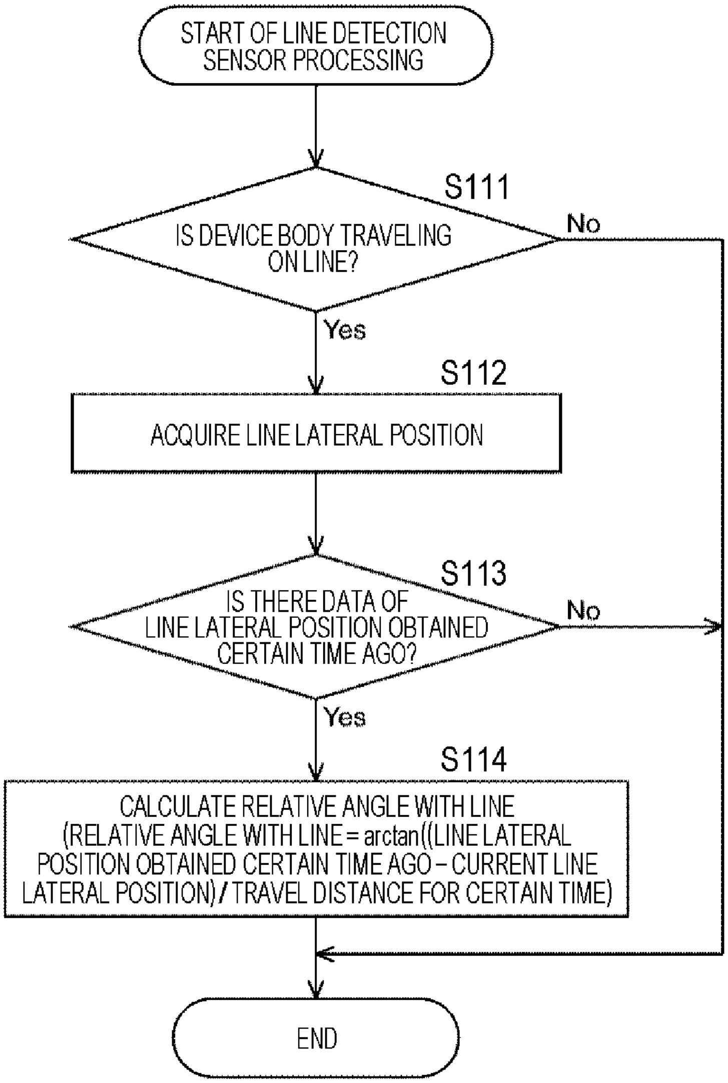
FIG. 10 is a flowchart illustrating processing related to a line sensor.

Processing related to the line detection sensor 166 will be described with reference to a flowchart of FIG. 10.

In step S111, it is determined whether or not the device body is traveling on a line. In a case where it is determined in the determination process of step S111 that the device body is traveling on a line, the processing proceeds to step S112. For example, in the robot device 10, when a mode of traveling on a line of a floor surface is set, it can be determined that it is the time of traveling on the line.

In step S112, a lateral position of the line is acquired. As the line lateral position, for example, a position in the vertical direction (lateral direction) with respect to the traveling direction of the device body can be used. Data of the line lateral position is sequentially stored in a memory (not illustrated) such as a random access memory (RAM).

In step S113, it is determined whether or not the data of the line lateral position obtained a certain time ago is stored in the memory. In a case where it is determined in the determination process of step S113 that there is the data obtained the certain time ago, the processing proceeds to step S114.

In step S114, the line lateral position acquired in step S112 is applied to the following Formula (11) to calculate a relative angle with the line.

Relative angle with line=arctan((line lateral position obtained certain time ago−current line lateral position)/travel distance for certain time) (11)

In this manner, the relative angle with the line obtained when the device body travels on the line is used for self-position estimation. Note that the processing of the line detection sensor 166 ends when the process of step S114 ends, in a case where it is determined in the determination process of step S111 that the device body is not traveling on the line, or in a case where it is determined in the determination process of step S113 that there is no data obtained the certain time ago.

As described above, the robot device 10 to which the present disclosure is applied includes: the sensor unit 152 including at least the IMU 161, the wheel speed sensor 162, and the mouse sensor 163; and the self-position estimation unit 153 that estimates the self-position on the basis of parameters calculated by the sensor unit 152, and the self-position estimation unit 153 uses a predetermined parameter suitable for a predetermined condition among the parameters of the respective sensors calculated by the sensor unit 152 when estimating the self-position. Furthermore, the sensor unit 152 can include a sensor such as the UWB unit 164, the GNSS unit 165, or the line detection sensor 166.

In the robot device 10 to which the present disclosure is applied, characteristics of each of the sensors of the sensor unit 152 is utilized to use a parameter calculated using the sensor signal that can be detected (measured) by each of the sensors with high accuracy as the predetermined parameter suitable for the predetermined condition, so that it is possible to implement the higher-speed self-position estimation with higher-accuracy and with a smaller calculation load.

That is, since various self-position estimation means is used as a use method suitable for the robot device 10 capable of moving at a high speed, it is possible to stably implement highly accurate self-position estimation. For example, a highly accurate self-position estimation means in a gymnasium, a ground, or the like in which it is difficult to install a marker or the like in a surrounding environment unlike a factory, a warehouse, or the like is provided. Note that in the factory or the warehouse, an object serving as a mark, such as a magnetic marker or a two-dimensional code, is often installed in a surrounding environment.

Meanwhile, as the self-position estimation of the robot device, it is generally known to use a sensor (internal sensor) mounted on the device body such as a wheel odometer or an IMU in combination with a sensor (external sensor) installed in an external environment such as position measurement using a GNSS or a camera that measures a position of the device body from the outside. In general autonomous mobile robot devices and the like, one employing dead reckoning using an internal sensor, one employing map matching using LiDAR, one estimating a motion of a device body from a camera image, and the like are known.

However, in current techniques, it is difficult to perform highly accurate self-position estimation in a case where a robot device travels at a relatively high speed in an environment where there are few target characteristic points in a wide space and it is not easy to take a measure by adding a marker or the like or the like. For example, in a case where the robot device travels at a speed of about 3 m/s to 5 m/s, it is difficult to perform highly accurate self-position estimation on the order of centimeters.

Here, in a case where self-position estimation is performed by dead reckoning using an internal sensor, which is used in a general cleaning robot or the like, the following problems occur. That is, in the case of using a wheel odometer, a self-position greatly deviates due to the influence of a slip in a robot device requiring a high speed and high acceleration and deceleration. Furthermore, in a case where an IMU is used to obtain an orientation, it is difficult to accurately obtain the orientation due to factors such as drift of a gyroscope and the influence of metal on a compass, and thus, it is difficult to estimate a self-position with high accuracy in a wide space. In particular, in a case where a robot device moves in a wide area such as a gymnasium, a stadium, or a schoolyard, a minute error of an attitude angle causes a large error in a distant side, and thus, it is necessary to mount an IMU or the like which has higher performance (ultra-high performance).

In a case where self-position estimation is performed by a transport robot that moves at a relatively high speed in a warehouse or the like, the following problems occur. That is, although automatic transport robots that are generally used include one moving at a high speed, a marker, such as a magnetic tape or a two-dimensional code, is often installed on the environment side since the robots travel in a specific area, such as a warehouse or a factory, and there is a problem that it takes time for set-up at a place where the robots are desired to move. Since there are fixed facilities and the like in the case of the warehouse or the factory, it is possible to estimate a self-position by employing a technique using LiDAR or a proximity sensor such as near-field communication (NFC), but it is difficult to install a sensor on the environment side in a wide and flat space such as the gymnasium or the stadium, and it is difficult to employ a similar technique.

In a case where map matching using LiDAR or characteristic point-based self-position estimation using a camera image is performed, the following problems occurs. That is, it is known that a calculation load is extremely large in a case where processing of the LiDAR or the camera is performed, and it is difficult to mount such a function on a small robot device having a small battery capacity. Moreover, not only the calculation load is high but also the processing takes time, and thus, the latency is reduced, so that a self-position is delayed with respect to an actual position in a case where a robot device moves at a high speed. Furthermore, in the case of traveling in a wide space such as a gymnasium or a stadium, there is a possibility that a measurement area of the LiDAR is exceeded or a characteristic point captured by the camera is limited.

In a case where self-position estimation is performed from a position of a GNSS or a two-dimensional code, the following problems occur. That is, in the case where the GNSS is used, there is the influence from positions and the number of satellites since a measurement cycle is relatively long. Furthermore, in the case where the two-dimensional code is used, calculation cost increases in processing of a camera image.

The robot device 10 to which the present disclosure is applied has the above-described configurations against these problems, and thus, can be used as an autonomous mobile robot device that moves at a high speed particularly in a wide area, such as a gymnasium or a stadium, and can implement the self-position estimation with a relatively small calculation load, low latency, and high accuracy.

2. Modified Examples

Although the differential two-wheel drive type has been exemplified as the drive type of the robot device 10 in the above description, other drive types such as an omnidirectional mobile type may be used.

Furthermore, the case where the robot device 10 is driven with one axis at the time of changing the attitude of the video display unit 102 including the display has been exemplified in the above description, but the driving may be performed with two axes or the like without being limited to one axis. The display information displayed on the display is not limited to the video, and may be information such as an image and text. Furthermore, a plurality of the robot devices 10 may be arranged in a matrix, and displays of the respective robot devices 10 may be combined and used as one screen (large screen) having a predetermined shape in a pseudo manner. At that time, each of the robot devices 10 may adjust an attitude of (the display of) the video display unit 102 according to a situation, such as a self-position or a position of a target user, to set a desired attitude.

The robot device 10 to which the present disclosure is applied can be regarded as an autonomous mobile device having a controller such as the control unit 101. The controller may be provided not only inside the robot device 10 but also in an external device.

Furthermore, the robot device 10 to which the present disclosure is applied can be regarded as a system (autonomous movement system) in which a plurality of devices such as a control device, a sensor device, a display device, a communication device, and a movement mechanism is combined. Here, the system means a set of a plurality of constituent elements (devices, modules (components), and the like), and whether or not all the constituent elements are provided in the same housing does not matter. Therefore, both a plurality of devices housed in separate housings and connected via a network, and a device in which a plurality of modules is housed in one housing are systems.

Furthermore, the robot device 10 to which the present disclosure is applied can further include an attachment for cleaning. The attachment for cleaning is a mop-shaped attachment, and is attached to a front surface, a rear surface, a side surface, a lower surface, and the like of the robot device 10, so that the robot device 10 can clean a travel route while autonomously traveling. A portion to be cleaned may be given in advance as the travel route, and furthermore, cleaning may be performed by recognizing an instruction such as "clean here" from an instructor by gesture recognition. As the gesture recognition, recognition processing of an attitude, a motion, or the like of a target instructor is performed on the basis of a sensor signal from each of the sensors (camera or the like) of the sensor unit 152, whereby the gesture of the target is recognized.

Moreover, a cleaning operation and video display may be cooperatively performed. In this case, when cleaning is started, during cleaning, or when cleaning is completed, a video indicating such a fact may be displayed, or an advertisement or another video may be displayed during cleaning. Moreover, an attitude of (the display of) the video display unit 102 may be controlled together. Furthermore, the attachment for cleaning is not limited to the illustrated mop-shaped attachment, and includes another attachment such as a dust-removing attachment.

3. Configuration of Computer

The above-described series of processes can be executed not only by hardware but also by software. In a case where the series of processes is executed by software, a program constituting the software is installed in a computer in each device.

Figure 11:
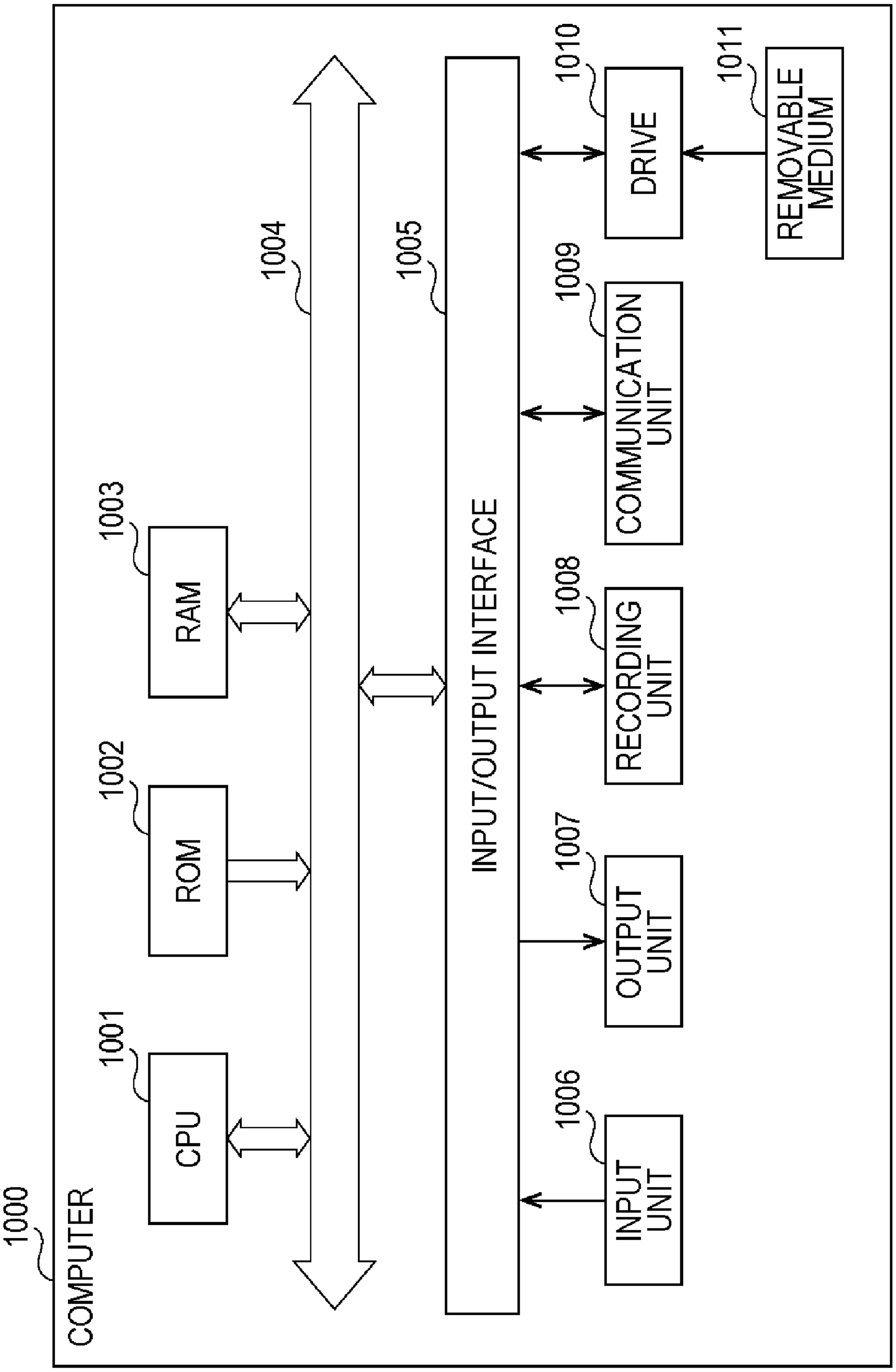
FIG. 11 is a diagram illustrating an example of configurations of a computer.

FIG. 11 is a block diagram illustrating a configuration example of hardware of a computer that executes the above-described series of processes according to a program.

In a computer 1000, a central processing unit (CPU) 1001, a read only memory (ROM) 1002, and a random access memory (RAM) 1003 are mutually connected by a bus 1004. Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes a microphone, a keyboard, a mouse, and the like. The output unit 1007 includes a speaker, a display, and the like. The recording unit 1008 includes a hard disk, a non-volatile memory, and the like. The communication unit 1009 includes a network interface or the like. The drive 1010 drives a removable medium 1011 such as a magnetic disk, an optical disk, a magneto-optical disk, or a semiconductor memory.

In the computer 1000 configured as described above, the CPU 1001 executes a program recorded in the ROM 1002 or the recording unit 1008 in the state of being loaded on the RAM 1003 via the input/output interface 1005 and the bus 1004, thereby performing the above-described series of processes.

The program executed by the computer 1000 (CPU 1001) can be provided in the state of being recorded on, for example, the removable medium 1011 as a package medium or the like. Furthermore, the program can be provided via a wired or wireless transmission medium such as a local area network, the Internet, and digital satellite broadcasting.

In the computer 1000, the program can be installed in the recording unit 1008 via the input/output interface 1005 by mounting the removable medium 1011 to the drive 1010. Furthermore, the program can be received by the communication unit 1009 via a wired or wireless transmission medium and installed in the recording unit 1008. In addition, the program can be installed in advance in the ROM 1002 and the recording unit 1008.

Here, in the present specification, the processing performed by the computer according to the program is not necessarily performed in time series in the order described as a flowchart. That is, the processing performed by the computer according to the program also includes processing executed in parallel or individually (for example, parallel processing or processing by an object). Furthermore, the program may be processed by one computer (processor) or may be processed in a distributed manner by a plurality of computers.

Furthermore, each step described in the above-described processes can be not only executed by one device but also shared and executed by a plurality of devices. Moreover, in a case where a plurality of processes is included in one step, the plurality of processes included in one step can be not only executed by one device but also shared and executed by a plurality of devices.

Note that embodiments of the present technology are not limited to the above-described embodiments, and various modifications can be made within a scope not departing from a gist of the present disclosure. Furthermore, the effects described in the present specification are merely examples and are not limited, and other effects may be present.

Note that the present technology can have the following configurations.

(1)

An autonomous mobile device including:

a sensor unit including at least a first sensor that detects an angular velocity, a second sensor that is installed in a housing and detects a speed of a wheel, and a third sensor that detects a displacement amount on a two-dimensional plane; and a self-position estimation unit that estimates a self-position on the basis of parameters calculated by the sensor unit, in which the self-position estimation unit uses a predetermined parameter suitable for a predetermined condition among the parameters of the respective sensors calculated by the sensor unit when estimating the self-position.

(2)

The autonomous mobile device according to (1), in which the first sensor is an IMU, and the self-position estimation unit estimates a traveling direction of a device body on the basis of a Z-axis angular velocity detected by the IMU.

(3)

The autonomous mobile device according to (1) or (2), in which the second sensor is a wheel speed sensor, and the self-position estimation unit estimates a movement distance with respect to a traveling direction of a device body on the basis of a speed detected by the wheel speed sensor.

(4)

The autonomous mobile device according to (3), in which the second sensor is a wheel encoder installed in a portion other than a drive wheel of the device body.

(5)

The autonomous mobile device according to any one of (1) to (4), in which the third sensor is a mouse sensor, and the self-position estimation unit estimates a slip amount in a vertical direction with respect to a traveling direction of a device body on the basis of a displacement amount detected by the mouse sensor in a case where a speed is lower than a predetermined speed.

(6)

The autonomous mobile device according to (2), in which the sensor unit further includes a fourth sensor that acquires an absolute position, and the self-position estimation unit corrects the traveling direction of the device body using the absolute position acquired by the fourth sensor in a case where the device body travels straight at a speed equal to or higher than a predetermined speed.

(7)

The autonomous mobile device according to (6), in which the self-position estimation unit estimates a current position of the device body by using a moving average obtained by removing an outlier from the absolute position acquired by the fourth sensor in a case where the device body is stationary or making a spin turn.

(8)

The autonomous mobile device according to (6) or (7), in which the fourth sensor includes at least one of a first position sensor that acquires position information measured using a UWB or a second position sensor that acquires position information measured using a GNSS.

(9)

The autonomous mobile device according to any one of (1) to (8), in which the sensor unit further includes a fifth sensor that detects a position of a line on a moving surface, and the self-position estimation unit estimates a traveling direction of a device body on the basis of the position of the line detected by the fifth sensor in a case where the device body is traveling on the line.

(10)

The autonomous mobile device according to any one of (1) to (9), further including:

a display section that displays display information; and a controller that controls display of the display information on the basis of the self-position.

(11)

The autonomous mobile device according to any one of (1) to (10), being configured as a differential two-wheel drive-type robot device.

(12)

A control method including estimating, by an autonomous mobile device, a self-position on the basis of parameters calculated by a sensor unit including at least a first sensor that detects an angular velocity, a second sensor that is installed in a housing and detects a speed of a wheel, and a third sensor that detects a displacement amount on a two-dimensional plane, in which a predetermined parameter suitable for a predetermined condition is used among the parameters of the respective sensors calculated by the sensor unit when the self-position is estimated.

(13)

A program for causing a computer to function as an autonomous mobile device including:

a sensor unit including at least a first sensor that detects an angular velocity, a second sensor that is installed in a housing and detects a speed of a wheel, and a third sensor that detects a displacement amount on a two-dimensional plane; and a self-position estimation unit that estimates a self-position on the basis of parameters calculated by the sensor unit, the self-position estimation unit using a predetermined parameter suitable for a predetermined condition among the parameters of the respective sensors calculated by the sensor unit when estimating the self-position.

REFERENCE SIGNS LIST

10 Robot device
101 Control unit
102 Video display unit
103 Screen lifting and lowering unit
104-1 Left motor encoder
104-2 Right motor encoder
105-1 Left motor
105-2 Right motor
106-1 to 106-3, 106 Sensor
107 Battery unit
151 Battery unit
152 Main CPU
161 IMU
162 Wheel speed sensor
163 Mouse sensor
164 UWB unit
165 GNSS unit
166 Line detection sensor
171 Integral calculator
172 Vehicle speed converter
173 Coordinate system converter
174 Integral calculator
175 Coordinate system converter
176 Traveling direction calculator
177 Outlier removal and moving averaging unit
178 Traveling direction calculator
179 Outlier removal and moving averaging unit
180 Traveling direction calculator
181 Fusion unit
182 Controller

The invention claimed is:

1. An autonomous mobile device, comprising:

a housing;

a sensor unit that includes at least a first sensor, a second sensor, and a third sensor, wherein the first sensor is configured to detect an angular velocity of the autonomous mobile device, the second sensor is in the housing of the autonomous mobile device, the second sensor is configured to detect a speed of a wheel of the autonomous mobile device, and the third sensor is configured to detect a displacement amount, on a two-dimensional plane, of the autonomous mobile device; and a central processing unit (CPU) configured to:

acquire a plurality of parameters from the sensor unit, wherein the plurality of parameters includes the angular velocity of the autonomous mobile device, the speed of the wheel of the autonomous mobile device, and the displacement amount of the autonomous mobile device;

determine a traveling state of the autonomous mobile device;

select a specific parameter from the plurality of parameters based on the determined traveling state, wherein the selected specific parameter is one of the angular velocity of the autonomous mobile device, the speed of the wheel of the autonomous mobile device, or the displacement amount of the autonomous mobile device; and estimate a self-position of the autonomous mobile device based on the selected specific parameter.

2. The autonomous mobile device according to claim 1, wherein the first sensor is an inertial measurement unit (IMU), the IMU is configured to detect a Z-axis angular velocity of the autonomous mobile device; and the CPU is further configured to estimate a traveling direction of the autonomous mobile device based on the Z-axis angular velocity.

3. The autonomous mobile device according to claim 1, wherein the second sensor is a wheel speed sensor, the wheel speed sensor is configured to detect the speed of the wheel, and the CPU is further configured to estimate a movement distance with respect to a traveling direction of the autonomous mobile device based on the detected speed.

4. The autonomous mobile device according to claim 3, further comprising a drive wheel, wherein the second sensor is a wheel encoder, and the wheel encoder is in a portion other than the drive wheel of the autonomous mobile device.

5. The autonomous mobile device according to claim 1, wherein the third sensor is a mouse sensor, the mouse sensor is configured to detect the displacement amount of the autonomous mobile device, and the CPU is further configured to estimate a slip amount in a vertical direction with respect to a traveling direction of the autonomous mobile device based on the displacement amount.

6. The autonomous mobile device according to claim 2, wherein the sensor unit further includes a fourth sensor, the fourth sensor is configured to acquire an absolute position of the autonomous mobile device, and the CPU is further configured to correct the traveling direction of the autonomous mobile device based on the absolute position.

7. The autonomous mobile device according to claim 6, wherein the CPU is further configured to estimate, based on a moving average process, a current position of the autonomous mobile device obtained by removal of an outlier from the absolute position, in a case where the autonomous mobile device is stationary or making a spin turn.

8. The autonomous mobile device according to claim 6, wherein the fourth sensor includes at least one of a first position sensor or a second position sensor, the first position sensor is configured to acquire position information measured by an ultra-wide band (UWB), and the second position sensor is configured to acquire position information measured by a global navigation satellite system (GNSS).

9. The autonomous mobile device according to claim 1, wherein the sensor unit further includes a fifth sensor, the fifth sensor is configured to detect a position of a line on a moving surface, and the CPU is further configured to estimate a traveling direction of the autonomous mobile device based on the position of the line, in a case where the autonomous mobile device is traveling on the line.

10. The autonomous mobile device according to claim 1, further comprising:

a display section configured to display display information; and the CPU is further configured to control the display of the display information based on the self-position.

11. The autonomous mobile device according to claim 1, wherein the autonomous mobile device is configured as a differential two-wheel drive-type robot device.

12. The autonomous mobile device according to claim 1, wherein the third sensor is an optical sensor, and the third sensor is configured to:

capture an image of a moving surface;

analyze the captured image of the moving surface; and detect the displacement amount on the two-dimensional plane based on the captured image and the analyzed image, wherein the autonomous mobile device is on the moving surface.

13. The autonomous mobile device according to claim 1, wherein the traveling state comprises a low-speed travel, a high-speed travel, and a straight travel, and a first speed of the autonomous mobile device in the low-speed travel is less than a second speed of the autonomous mobile device in the high-speed travel.

14. The autonomous mobile device according to claim 1, wherein the CPU is further configured to exclude, prior to the selection of the specific parameter, at least one parameter from the plurality of parameters, and the at least one parameter is excluded based on the traveling state.

15. The autonomous mobile device according to claim 1, wherein the CPU is further configured to acquire, from the sensor unit, an absolute position of the autonomous mobile device; and correct a traveling direction of the autonomous mobile device based on the acquired absolute position.

16. A control method, comprising:

detecting, by a first sensor of a sensor unit, an angular velocity of an autonomous mobile device;

detecting, by a second sensor of the sensor unit, a speed of a wheel of the autonomous mobile device;

detecting, by a third sensor of the sensor unit, a displacement amount, on a two-dimensional plane, of the autonomous mobile device;

acquiring, by a central processing unit (CPU), a plurality of parameters from the sensor unit, wherein the plurality of parameters includes the angular velocity of the autonomous mobile device, the speed of the wheel of the autonomous mobile device, and the displacement amount of the autonomous mobile device;

determining, by the CPU, a traveling state of the autonomous mobile device;

selecting, by the CPU, a specific parameter from the plurality of parameters based on the determined traveling state, wherein the selected specific parameter is one of the angular velocity of the autonomous mobile device, the speed of the wheel of the autonomous mobile device, and the displacement amount of the autonomous mobile device; and estimating, by the CPU, a self-position of the autonomous mobile device based on the selected specific parameter.

17. A non-transitory computer-readable medium having stored thereon, computer-executable instructions which, when executed by a computer, cause the computer to execute operations, the operations comprising:

detecting, by a first sensor of a sensor unit, an angular velocity of an autonomous mobile device;

detecting, by a second sensor of the sensor unit, a speed of a wheel of the autonomous mobile device;

detecting, by a third sensor of the sensor unit, a displacement amount, on a two-dimensional plane, of the autonomous mobile device;

acquiring, by a central processing unit (CPU), a plurality of parameters from the sensor unit, wherein the plurality of parameters includes the angular velocity of the autonomous mobile device, the speed of the wheel of the autonomous mobile device, and the displacement amount of the autonomous mobile device;

determining, by the CPU, a traveling state of the autonomous mobile device;

selecting, by the CPU, a specific parameter from the plurality of parameters based on the determined traveling state, wherein the selected specific parameter is one of the angular velocity of the autonomous mobile device, the speed of the wheel of the autonomous mobile device, and the displacement amount of the autonomous mobile device; and estimating, by the CPU, a self-position of the autonomous mobile device based on the selected specific parameter.

* * * * *